June 1, 1965 D. M. MURANAKA ETAL 3,187,234
SELECTIVE SIGNAL-RESPONSIVE CIRCUIT
Filed Nov. 8, 1962
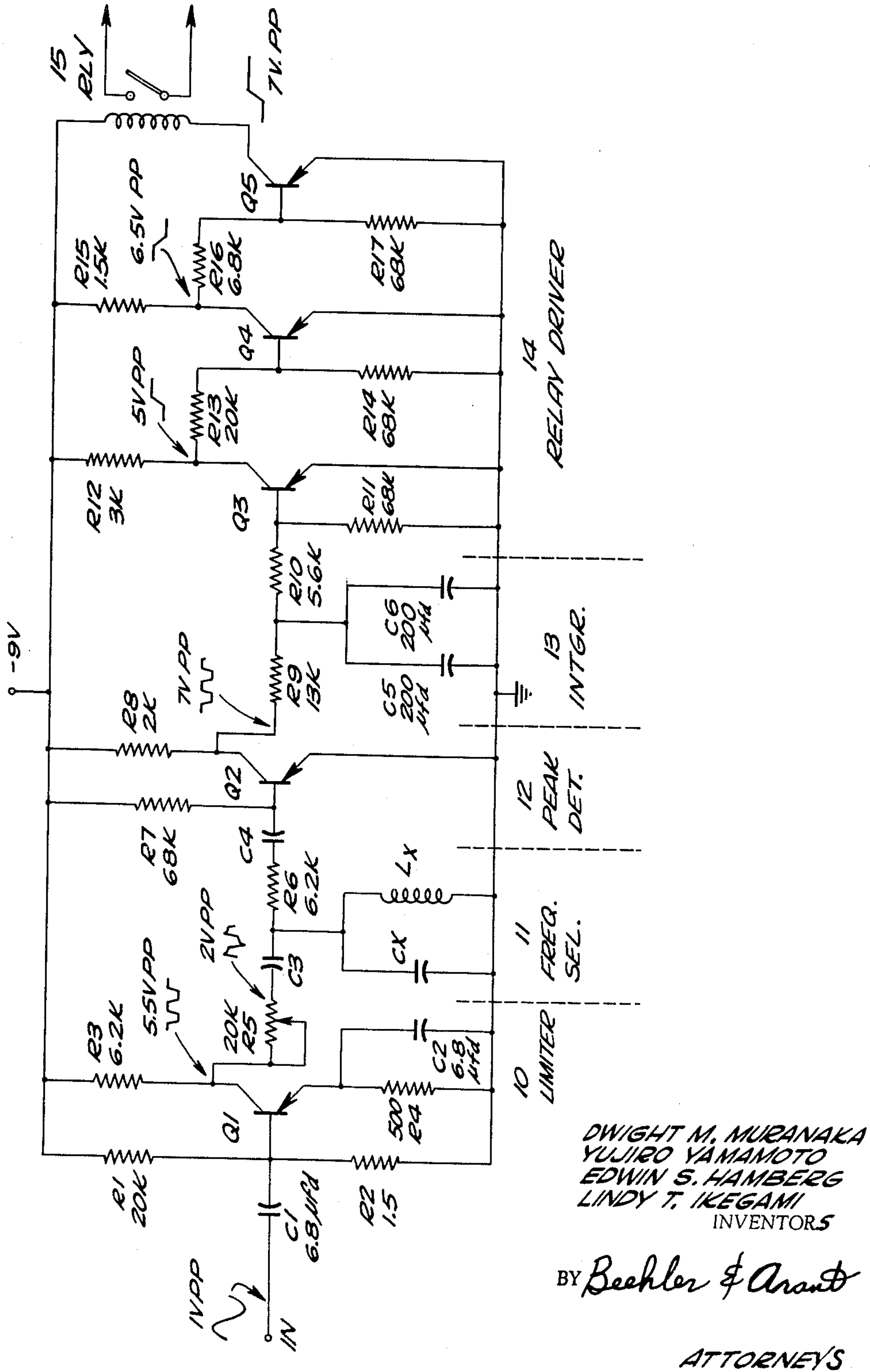
DWIGHT M. MURANAKA
YUJIRO YAMAMOTO
EDWIN S. HAMBERG
LINDY T. IKEGAMI
INVENTORS
BY Beehler & Arant
ATTORNEYS 3,187,234

SELECTIVE SIGNAL-RESPONSIVE CIRCUIT

Dwight M. Muranaka, Yujiro Yamamoto, and Edwin S. Hamberg, Santa Ana, and Lindy T. Ikegami, Anaheim, Calif., assignors to Y 2 Associates, Inc., a corporation of California Filed Nov. 8, 1962, Ser. No. 236,384
3 Claims. (Cl. 317—147)

The present invention relates to an electrical circuit for responding to a signal of a predetermined frequency only when that signal has at least a predetermined amplitude for at least a predetermined period of time.

There are numerous applications in which receiving apparatus is intended to be actuated by a predetermined calling signal, and where it is necessary to reliably distinguish the predetermined calling signal from other signals whose characteristics may be similar to a greater or lesser extent. Such a calling signal may, for example, be a sine-wave signal of a predetermined frequency and predetermined amplitude which is generated continuously for at least a certain period of time.

In receiving a signal of this nature it is necessary to distinguish reliably from other somewhat similar signals. It is also necessary for the apparatus to be able to respond to the calling signal regardless of its amplitude, so long as the amplitude exceeds or equals a predetermined value. The reliability, the size, and the cost of the receiving apparatus are of course important factors.

One object of the invention, therefore, is to provide an electrical circuit which reliably responds to a calling signal of a predetermined frequency, whenever the calling signal exceeds a predetermined amplitude for a predetermined time period.

Another object of the invention is to provide an electrical circuit of the foregoing type which is adapted for actuating a relay in response to the reception of the predetermined calling signal.

A further object of the invention is to provide a circuit of the foregoing type which incorporates transistors as the primary active signal control elements of the circuit.

The objects and advantages of the invention will be more readily appreciated from the following description considered in conjunction with the accompanying drawing, the sole figure of which illustrates the presently preferred embodiment of the invention.

Referring now to the drawing it will be seen that the invention comprises, in a broad sense, several circuits of different types which are coupled in a series arrangement with the last circuit coupled to a relay for actuating the same in response to the reception of the predetermined calling signal. Thus the calling signal is first supplied to a limiter circuit 10 wherein both the positive peaks and negative peaks of the wave form are squared off. The output signal from the limiter circuit has a peak-to-peak value of approximately 5.5 volts no matter how great the input signal amplitude, so long as it is sufficient to provide this minimum value. The limiter circuit 10 is not tuned for any particular frequency but simply serves the function of limiting or standardizing the amplitude of the incoming signal.

The next circuit block is a frequency selection circuit 11 which mainly comprises a conventional parallel resonant circuit across which the input signal is applied. This parallel resonant circuit is, of course, tuned for the predetermined frequency of the calling signal. Circuits of this type may, as is well known, be rather sharply tuned, with the result that the output of the frequency selection circuit provides a signal of essentially a sine-wave form regardless of the amount of distortion that may have been present in the calling signal received by the limiter circuit 10.

The next circuit block is a peak detector circuit 12 whose function it is to determine whether the frequency of the calling signal fell precisely at the tuned frequency of the selection circuit 11. The peak detector circuit 12 is so arranged as to clip off the negative half of each cycle of the incoming wave form, and to clip off all of the positive half of each incoming cycle of the wave form except that portion which exceeds a certain predetermined amplitude. If the calling signal were in fact significantly off the predetermined frequency value, then the signal amplitude at the output of the frequency selector 11 would not quite be sufficient to provide an output signal from the peak detector 12. On the other hand, if the calling signal is at the correct predetermined frequency, then the signal output amplitude provided by the frequency selector 11 will be sufficient to provide an output signal from the peak detector 12.

The next circuit block is the integrator circuit 13 which utilizes the established principle of charging a capacitor through a resistor. Integrator circuit 13 has a signal input path coupled to the output of the peak detector circuit 12, and a signal output path coupled to the input of a relay driver circuit 14. The relay driver circuit normally has a very high input impedance, thus preventing the charge from draining out of the integrator circuit while it is being charged up from the signal supplied by the peak detector. When the charge in the integrator circuit 13 builds up to a predetermined level it causes the relay driver 14 to be actuated, with a consequent greatly reduced input impedance.

Thus it will be seen that the signal input path of the integrator circuit includes a resistor R9 having a resistance value of 13K ohms, while the signal output path includes a resistor R10 having a resistance value of 5.6K ohms. The input of the relay driver circuit 14 is the base of a transistor Q3, and this transistor is normally cut off thus providing an input impedance which is very high or perhaps substantially infinite. However, a full charge in the integrator circuit causes the transistor Q3 to become saturated, thereby reducing its input impedance to some small value such as 10 or 50 ohms, which would be negligible in comparison to the values of the resistors R9 and 10. Prior to turning on of the transistor Q3 the output or discharge impedance of the integrator 13 is very large compared to its input or charging impedance, but after Q3 becomes saturated the converse situation is true.

In the embodiment of the invention as presently illustrated the time required for the integrator circuit to become fully charged is approximately three to four seconds, and then the transistor Q3 at the input of the relay driver 14 is turned on. A relay 15 is in turn actuated by the relay driver circuit, but requires a period of energization of approximately 10 milliseconds before responding to the energy that is applied to it. Relay 15 may therefore be considered as a mechanical integrating device which integrates the electrical energy supplied to it.

Let it be supposed that an improper input signal were operable to charge the integrator 13 and turn on transistor Q3. Nevertheless, when Q3 turns on there must a continuous suply of energy to the integrator at a very high rate for the next 10 milliseconds, in order to ensure actuation of the relay. This requirement makes it certain that the relay will turn on only in response to the intended type of input signal.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What we claim is:

1. An electrical circuit for responding to a signal of a predetermined frequency having at least a predetermined amplitude for at least a predetermined period of time, said circuit comprising, in combination:

an amplitude limiting circuit for receiving an incoming signal;

a frequency selection circuit coupled to the output of said amplitude limiting circuit;

a peak detector circuit coupled to the output of said frequency selection circuit, and operable for amplifying only such portion of each cycle of the signal as exceeds a predetermined reference amplitude level;

an integrator coupled to the output of said peak detector circuit;

and a relay driver having an input coupled to said integrator to be actuated thereby.

2. An electrical circuit for responding to a signal of a predetemined frequency having at least a predetermined amplitude for at least a predetermined period of time, said circuit comprising, in combination:

circuit means for selectively passing said predetermined frequency signal in essentially a sine-wave form;

a peak detector circuit for amplifying only such portion of each cycle of said selectively passed signal as exceeds a predetermined reference amplitude level;

an integrator having a signal input path coupled to said peak detector circuit for receiving the amplified signals generated thereby, and a separate signal output path;

and a relay driver coupled to said signal output path and actuatable by said integrator when fully charged;

said relay driver normally having a high input impedance relative to that of said signal output path of said integrator, but when actuated being characterized by a greatly reduced input impedance, whereby the continued reception of said amplified signal is necessary in order to maintain the charge on said integrator to thereby continue the actuation of said driver.

3. An electrical circuit as claimed in claim 2 wherein said integrator includes a capacitor adapted to be charged through said signal input path and discharged through said input and output paths in parallel, said signal input path and said signal output path each including a respective resistor, the value of said resistor included in said signal input path being large compared to the value of said resistor included in said signal output path.

References Cited by the Examiner

UNITED STATES PATENTS

| | | | |
|---|---|---|---|
| 2,794,156 | 5/57 | Mohler | 340—171 X |
| 2,794,974 | 6/57 | Bagno | 340—171 X |
| 2,891,172 | 6/59 | Bruce | 307—88.5 |

SAMUEL BERNSTEIN, *Primary Examiner.*

REEXAMINATION CERTIFICATE (16th)

United States Patent [19] [11] B1 3,187,234

Muranaka et al. [45] Certificate Issued Sep. 7, 1982

[54] SELECTIVE SIGNAL-RESPONSIVE CIRCUIT

[75] Inventors: Dwight M. Muranaka; Yujiro Yamamoto; Edwin S. Hamberg, all of Santa Ana; Lindy T. Ikegami, Anaheim, all of Calif.

[73] Assignee: Y 2 Associates, Inc., Santa Ana, Calif.

Reexamination Request

No. 90/000,010, Jul. 1, 1981

Reexamination Certificate for:

Patent No.: 3,187,234
Issued: Jun. 1, 1965
Appl. No.: 236,384
Filed: Nov. 8, 1962

[51] Int. Cl.³ .......... H01H 47/20
[52] U.S. Cl. .......... 361/182; 340/127, 307/555

[56] References Cited

U.S. PATENT DOCUMENTS

| | | |
|---|---|---|
| 2,794,974 | 6/57 | Bagno et al. |
| 2,794,156 | 5/57 | Hohler et al. |
| 2,891,172 | 6/59 | Bruce et al. |
| 2,996,681 | 8/61 | Marks. |
| 2,897,354 | 7/59 | Bourget et al. |
| 2,930,955 | 3/60 | Bourget et al. |
| 3,028,554 | 4/62 | Hilliard. |
| 3,193,732 | 7/65 | Jamieson. |
| 2,804,608 | 8/57 | Carbaugh. |

FOREIGN PATENT DOCUMENT

| | | |
|---|---|---|
| 377,807 | 7/62 | Japan. |

OTHER PUBLICATIONS

"Electronics and Nucleonics Dictionary"—Cooke McGraw-Hill Book Co., Inc., 1960.

"Radiotron Designer's Handbook"—Langford-Smith Radio Corporation of America, 1953.

*Primary Examiner*—Harry E. Moose Jr.

[57] EXEMPLARY CLAIM

1. An electrical circuit for responding to a signal of a predetermined frequency having at least a predetermined amplitude for at least a predetermined period of time, said circuit comprising, in combination:

an amplitude limiting circuit for receiving an incoming signal;

a frequency selection circuit coupled to the output of said amplitude limiting circuit;

a peak detector circuit coupled to the output of said frequency selection circuit, and operable for amplifying only such portion of each cycle of the signal as exceeds a predetermined reference amplitude level;

an integrator coupled to the output of said peak detector circuit;

and a relay driver having an input coupled to said integrator to be actuated thereby.

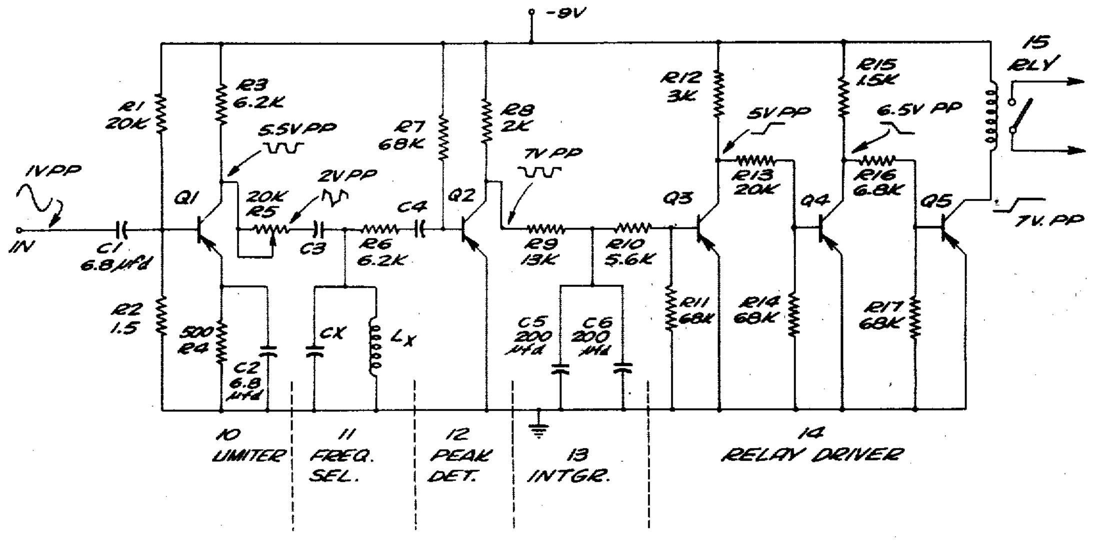

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1-3 is confirmed.

* * * * *